United States Patent [19]

Lui

[11] Patent Number: 4,659,543
[45] Date of Patent: Apr. 21, 1987

[54] CROSS BRACE FOR STIFFENING A WATER CROSS IN A FUEL ASSEMBLY

[75] Inventor: Chun K. Lui, Monroeville, Pa.

[73] Assignee: Westinghouse Electric Corp., Pittsburgh, Pa.

[21] Appl. No.: 672,042

[22] Filed: Nov. 16, 1984

[51] Int. Cl.$^4$ .............................................. G21C 3/32
[52] U.S. Cl. ................................... 376/444; 376/438; 376/439; 376/434; 376/443
[58] Field of Search ............... 376/444, 446, 438, 439, 376/443, 434

[56] References Cited

U.S. PATENT DOCUMENTS

| | | | |
|---|---|---|---|
| 4,097,330 | 6/1978 | Neissel | 376/434 |
| 4,478,786 | 10/1984 | Andersson | 376/444 |
| 4,526,744 | 7/1985 | Borrman | 376/444 |
| 4,560,532 | 12/1985 | Barry | 376/444 |
| 4,578,241 | 3/1986 | Borrman | 376/444 |

Primary Examiner—Donald P. Walsh

[57] ABSTRACT

A hollow water cross disposed in an outer flow channel of a fuel assembly so as to divide an array of fuel rods in the assembly into a plurality of subgroups is composed of a plurality of hollow panels which extend radially from a central axis of the water cross and define an open inner flow channel. The panels are interconnected at their outer ends with angularly displaced portions of the outer channel and at their inner ends with one another so as to define a central channel portion which extends the axial length of the water cross. The improvement relates to a cross brace disposed within the central channel portion of the water cross generally along the central axis thereof. The cross brace includes radially-extending portions which extend within and parallel to the respective water cross panels and interconnect with dimples formed in each panel so as to reinforce and stiffen the water cross and thereby the outer channel of the fuel assembly.

8 Claims, 6 Drawing Figures

CROSS BRACE FOR STIFFENING A WATER CROSS IN A FUEL ASSEMBLY

CROSS REFERENCE TO RELATED APPLICATIONS

Reference is hereby made to the following co-pending U.S. patent applications dealing with subject matter related to the present invention:

1. "Nuclear Fuel Assembly" by Robert F. Barry et al, U.S. Ser. No. 368,555, filed Apr. 15, 1982.
2. "Coolant Flow Paths Within a Nuclear Fuel Assembly" by Pratap K. Doski, U.S. Ser. No. 602,089, filed Apr. 19, 1984, a continuation of U.S. Ser. No. 368,552, filed Apr. 15, 1982 and now abandoned.

BACKGROUND OF THE INVENTION

1. Field of the Invention

The present invention relates generally to fuel assemblies for a nuclear reactor and, more particularly, is concerned with a cross brace incorporated in the water cross of a fuel assembly so as to eliminate most of the deflection of the interconnected water cross panels and outer flow channel of the fuel assembly due primarily to the internal pressure of the outer flow channel relative to the reactor system pressure.

2. Description of the Prior Art

Typically, large amounts of energy are released through nuclear fission in a nuclear reactor with the energy being dissipated as heat in the elongated fuel elements or rods of the reactor. The heat is commonly removed by passing a coolant in heat exchange relation to the fuel rods so that the heat can be extracted from the coolant to perform useful work.

A plurality of the fuel rods are grouped together to form a fuel assembly. A number of such fuel assemblies are typically arranged in a matrix to form a nuclear reactor core capable of a self-sustained, nuclear fission reaction. The core is submersed in a flowing liquid, such as light water, that serves as the coolant for removing heat from the fuel rods and as a neutron moderator. The fuel assemblies are typically grouped in clusters of four with one control rod associated with each four assemblies. The control rods is insertable within the fuel assemblies for controlling the reactivity of the core. Each such cluster of four fuel assemblies surrounding a control rod is commonly referred to as a fuel cell of the reactor core.

A typical fuel assembly in the cluster is ordinarily formed by a N by N array of the elongated fuel rods supported between upper and lower tie plates in laterally spaced-apart relation. In a fuel assembly of this type the fuel rods in the central region of the assembly may be undermoderated and overenriched. In order to remedy this condition by increasing the flow of moderator water through this region of the assembly, an elongated, centrally-disposed stiffening device with vertical water passageways, such as illustrated and described in Canadian Pat. No. 1,150,423 and U.S. Pat. No. 4,478,786 to Ingmar Andersson et al, or an elongated, centrally-disposed water cross, such as illustrated and described in the U.S. patent applications cross-referenced above, can be used. The water cross being in the form of a cruciform water flow channel provides a centrally-disposed cross-shaped path for the flow of subcooled neutron moderator water within the channel along the lengths of adjacent fuel rods.

In the central water cross of the above cross-referenced Barry et al patent application, numerous sealed passages were formed through its radial panels to permit coolant flow between the separate sections or subgroups of fuel rods of the assembly to provide hydraulic pressure equalization therebetween. To overcome certain difficulties in manufacturing panels with the passages and ensuring against weld failures therein, the above cross-referenced Doshi patent application provided a water cross which eliminates the passages through the radial panels, substituting in their place imperforate dimples which spaced-apart and interconnected the angles which made up the panels. Instead of the passages in the panels, Doshi formed coolant flow paths through each of a series of elongated, solid, vertically-extending ribs. Each rib is located between and interconnects the respective inner wall of the annular outer flow channel and the outer vertical edge of each water cross panel.

Notwithstanding the improvements fostered by the cruciform water cross flow channel of the Doshi patent application, it overlooked another problem which, if left uncorrected, limits the useful lifetime of the outer flow channel. During normal reactor operation, pressures inside the water cross channel and among the four subgroups of fuel rods within the outer channel are significantly greater than the pressure in the reactor system exterior thereto. The higher pressure in the outer channel especially, relative to the reactor pressure, tends to force the outer channel to take on a more cylindrical shape which, in turn, pulls radially outward on the radial panels of the water cross and tends to unbend the angles of the panels.

Consequently, the need exists for some means of counteracting such creep and distortion of the outer channel and water cross of the fuel assembly so as to prolong the useful life of the outer channel.

SUMMARY OF THE INVENTION

The present invention provides a stiffening cross brace in the central portion of the water cross channel which is designed to satisfy the aforementioned needs. The cross brace positioned axially along the central channel portion joins the dimples of the water cross panels together so as to anchor the panels to one another. With such form of interconnection, the panels are able to resist any radial outwardly-directed forces which would tend to pull the panels away from the longitudinal central axis of the central channel portion and allow rounding of the outer channel and unbending of the angles forming the panels. The result of adding this cross-shaped structural member is to significantly reduce the deflection of the outer channel and water cross panels and thereby increase the useful lifetime of the fuel assembly.

Accordingly, the present invention sets forth an improvment in a fuel assembly having upper and lower tie plates, a plurality of elongated fuel rods extending between the tie plates and disposed in side-by-side relationship so as to form an array of spaced fuel rods, a tubular channel surrounding the fuel rods so as to direct flow of coolant/moderator fluid along the fuel rods, and a hollow water cross having a plurality of panels composed of sheet members interconnected and spaced apart by a series of elements extending between the sheet members of each panel, the panels of the water cross being interconnected at their outer ends with angularly displaced portions of the tubular channel so as to divide the array of fuel rods into a plurality of subgroups and being interconnected with one another at their inner ends so as to define a central channel portion which extends the axial length of the water cross.

The improvement provided by the present invention is directed to means disposed in the central channel portion and interconnecting the series of elements of each panel with those of the other panels so as to reinforce and stiffen the panels at their inner ends to prevent deflection of the water cross panels and outer channel and thereby prolong the life of the tubular channel. More particularly, the interconnecting means takes the form of a cross-like structural member disposed along the central axis of the water cross and having radially-extending portions which meet generally at the central axis and extend outwardly in generally parallel relationship with and between the sheet members forming the respective panels of the water cross, and are attached at their outer longitudinal edges to the respective series of elements, in the form of dimples which interconnect the sheet members, of each one of the water cross panels. Specifically, the structural member is a cross brace which can take any of several forms. It can be a continuous structure extending between the upper and lower ends of the water cross. Alternatively, it can be made up of segments positioned in axially spaced apart relation along the central channel portion of the water cross. As another alternative, it can be made of a series of individual elongated straps axially spaced apart along the central channel portion and alternating between orthogonally-related positions so as to interconnect alternating opposite pairs of water cross panels.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
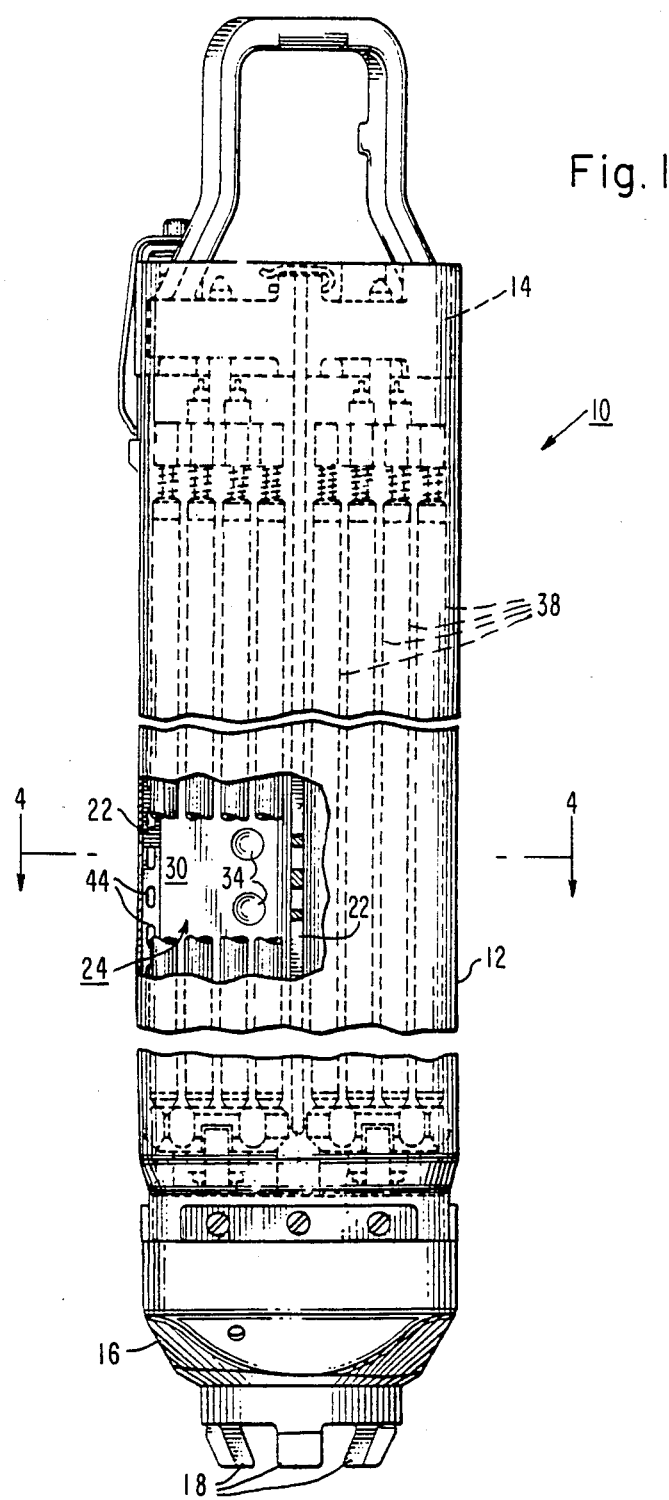
FIG. 1 is a broken-away, front elevational view of a nuclear fuel assembly in which the improved structural cross brace of the present invention is employed.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

In General

Referring now to the drawings, and particularly to FIG. 1, there is shown a nuclear fuel assembly, generally designated 10, for a boiling water nuclear power reactor (BWR), in which the improvement of the present invention (not shown) is incorporated. The fuel assembly 10 includes an elongated outer tubular flow channel 12 that extends along substantially the entire length of the fuel assembly 10 and interconnects and upper yoke 14 with a lower base 16. The base 16 which serves as an inlet for coolant flow into the outer channel 12 of the fuel assembly 10 includes a plurality of legs 18 for guiding the base 16 and the fuel assembly 10 into a reactor core support plate (not shown) or into fuel storage racks, for example, in a spent fuel pool.

The outer flow channel 12 (also see FIG. 2) generally of rectangular cross-section is made up of four interconnected vertical walls 20 each being displaced about ninety degrees one from the next. Secured to and centrally located along the inner surface of each wall 20 of the outer flow channel 12 is a generally vertically-extending structural rib 22. The ribs 22 and the outer flow channel 12 are preferably formed from a metal material, such as an alloy of zirconium, commonly referred to as Zircaloy, and may be securely interconnected by any convenient means, such as by welding. The upper ends of the structural ribs 22 are used to interconnect the outer flow channel 12 to the yoke 14.

Figure 2:
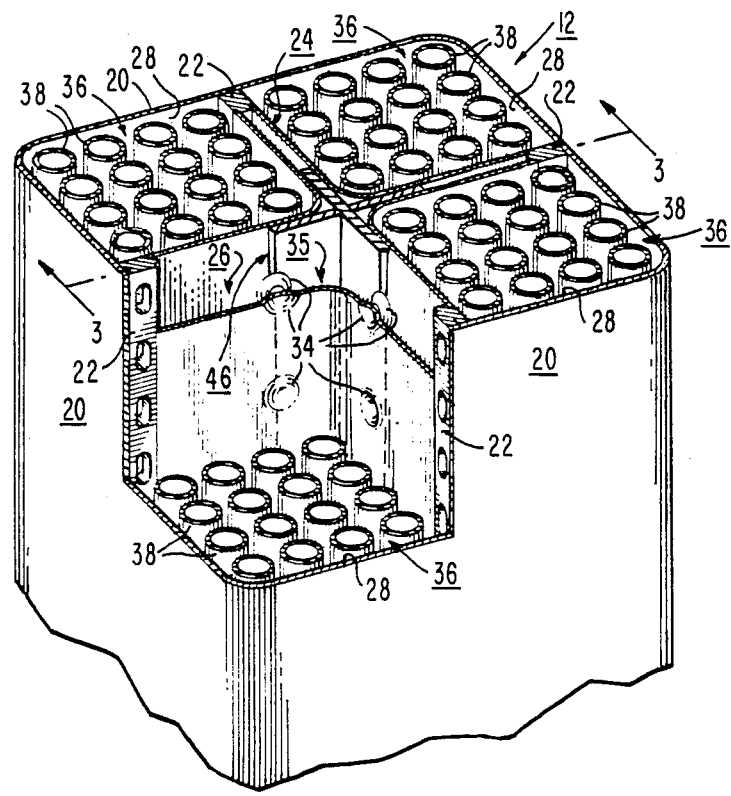
FIG. 2 is an enlarged, fragmentary, brokenaway, perspective view of a portion of the fuel assembly of FIG. 1, showing one embodiment of the cross brace of the present invention disposed in the central channel portion of the water cross and interconnecting the dimples of the panels thereof.
Figure 3:
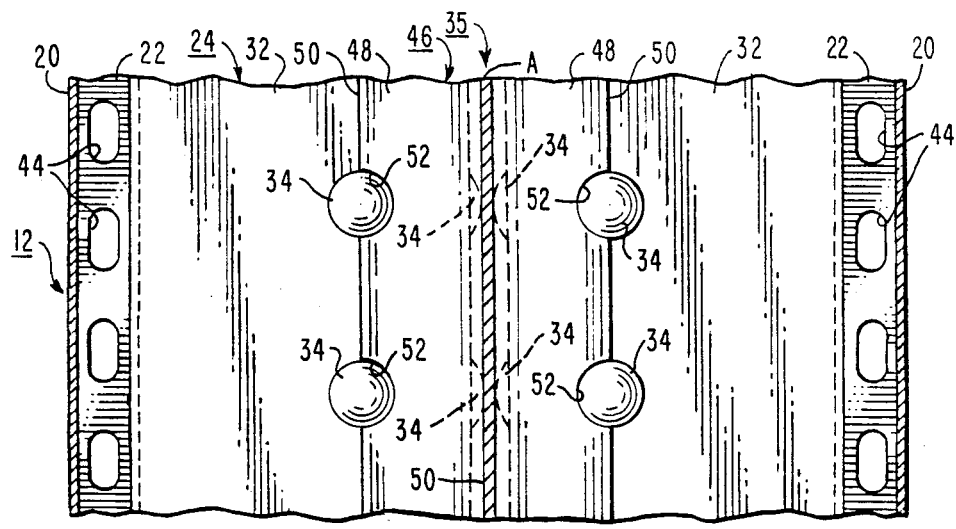
FIG. 3 is an enlarged, fragmentary view of a portion of the water cross of the fuel assembly and the cross brace interconnecting the panels of the water cross as seen along line 3—3 of FIG. 2.

For improving neutron moderation and economy, a hollow water cross, as seen in FIG. 2 and generally designated 24, extends axially through the outer channel 12 so as to provide an open inner channel 26 for subcooled moderator flow through the fuel assembly 10 and to divide the fuel assembly into four, separate, elongated compartments 28. The water cross 24 has a plurality of four radial panels 30 composed by a plurality of four, elongated, generally L-shaped, metal angles or sheet members 32 that extend generally along the entire length of the fuel assembly and are interconnected and spaced apart by a series of elements in the form of dimples 34 formed in the sheet members 32 of each panel 30 and extending therebetween. The dimples 34 are formed in and disposed in a vertical column along the axial length of the sheet members 32. Preferably, the dimples 34 in each of the sheet members 32 are laterally and vertically aligned with corresponding dimples 34 in adjacent sheet members 32 (FIGS. 2–4) in order to provide pairs of opposed dimples that contact each other along the lengths of the sheet members to maintain the facing portions of the members in a proper spaced-apart relationship. The pairs of contacting dimples 34 are connected together such as by welding to ensure that the spacing between the sheet members 32 forming the panels 30 of the central water cross 24 is accurately maintained.

The hollow water cross 24 is mounted to the angularly-displaced walls 20 of the outer channel 12. Preferably, the outer, elongated lateral ends of the panels 30 of the water cross 24 are connected such as by welding to the structural ribs 22 along the lengths thereof in order to securely retain the water cross 24 in its desired central position within the fuel assembly 10. Further, the inner ends of the panels 30 define a central channel portion 35 which extends the axial length of the hollow water cross 24.

Disposed within each of the compartments 28 is a separate fuel subassembly or subgroup 36 composed of a plurality of fuel rods 38, such as sixteen in number in a 4×4 array. The fuel rods 38 of each subgroup 36 extend in laterally spaced apart relationship between an upper tie plate 40 and a lower tie plate 42 of the fuel assembly 10. Coolant flow paths and flow communication are provided between the fuel rod subgroups 36 in the respective separate compartments 28 of the fuel assembly 10 by a plurality of apertures 44 formed through each of the structural ribs 22 along the lengths thereof. Coolant flow through the apertures 44 serves to equalize the hydraulic pressure between the four separate compartments 28, thereby minimizing the possibility of thermal hydrodynamic instability between the separate fuel rod subgroups 36.

The above-described basic components of the BWR are known in the prior art, being disclosed particularly in the second patent application cross referenced above, and have been discussed in sufficient detail herein to enable one skilled in the art to understand the improvement of the present invention presented hereinafter. For a more detailed description of the construction of the BWR, attention is directed to both of the above cross-referenced patent applications.

Improved Cross-Like Structural Bracing Member

As mentioned previously, during normal BWR operation, pressures inside the open inner channel 26 of the hollow water cross 24 and the outer channel 12, especially, are significantly greater than the reactor system pressure. This frequently results in the outer flow channel 12 taking on a more cylindrical cross-sectional shape which, in turn, pulls radially outward on the panels 30 of the water cross 24. Such stretching action on the water cross 24 tends to distort its panels 30 by unbending the angles of the sheet members 32 forming them.

Turning now to FIGS. 2–5, there is shown one embodiment of the improvement provided by the present invention, that being a cross-like structural member, referred to hereinafter as a cross brace and being generally designated by the numeral 46. The cross brace 46 is disposed in the central channel portion 35 of the hollow water cross 24 and interconnects the series of dimples 34 formed in an aligned column in each panel 30 with those of the other panels 30. In such manner, the panels 30 at their inner ends are reinforced and stiffened so as to prevent deflection of the sheet members 32 forming the panels 30 and thereby also prevent deflection or bowing of the outer flow channel 12.

Figure 4:
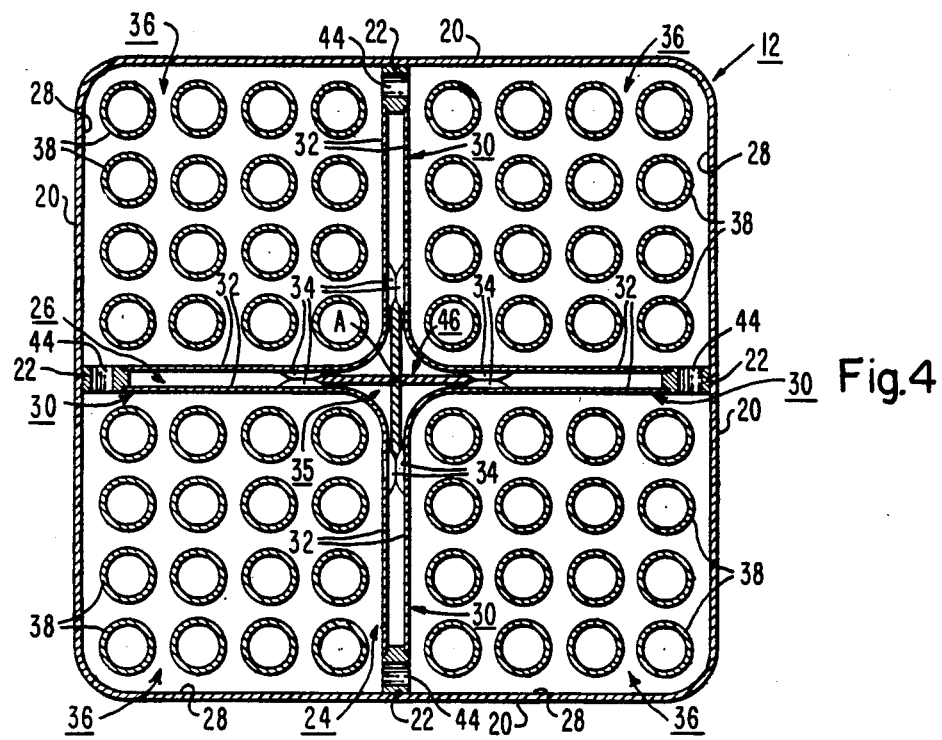
FIG. 4 is an enlarged, cross-sectional view of the fuel assembly taken along line 4—4 of FIG. 1.
Figure 5:
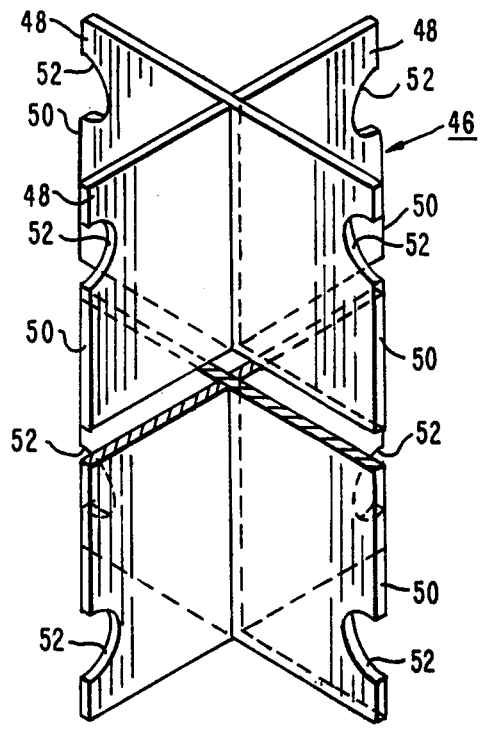
FIG. 5 is an enlarged, vertically foreshortened, perspective view of one embodiment of the cross brace constituting the improvement of the present invention.

More particularly, the cross brace 46 is disposed along the central axis A of the water cross 24 and has a series of radially-extending, blade-like portions 48. The planes of the portions intersect generally along the central axis A of the water cross 24. More particularly, the portions 48 meet and are rigidly connected together such as by welding generally at the central axis A of the water cross 24. From there, each portion 48 extends radially outward in generally parallel relationship with and between the sheet members 32 forming the respective panels 30 of the water cross 24. At their outer longitudinal edges 50, as seen in FIG. 4, the blade-like portions 48 of the cross brace 46 are attached such as by welding to each interconnected dimple pair of the respective columns of dimples 34 of the panels 30. Specifically, in an exemplary form, half moon-shaped cutouts 52 are formed in the outer edges 50 of the portions 48 at the locations of the pairs of dimples 34 such that the parts of the outer edges 50 of the cross brace 46 which are rigidly attached to the dimples will also partly encircle the interconnected dimple pairs.

Although the form of the cross brace 46 depicted in FIGS. 2–5 is a continuous structure extending between the upper and lower ends of the hollow water cross, the present invention is not so limited. Alternatively, the cross brace 46 can be made up of segments positioned in spaced apart relation axially along the central channel portion 35 of the water cross.

Figure 6:
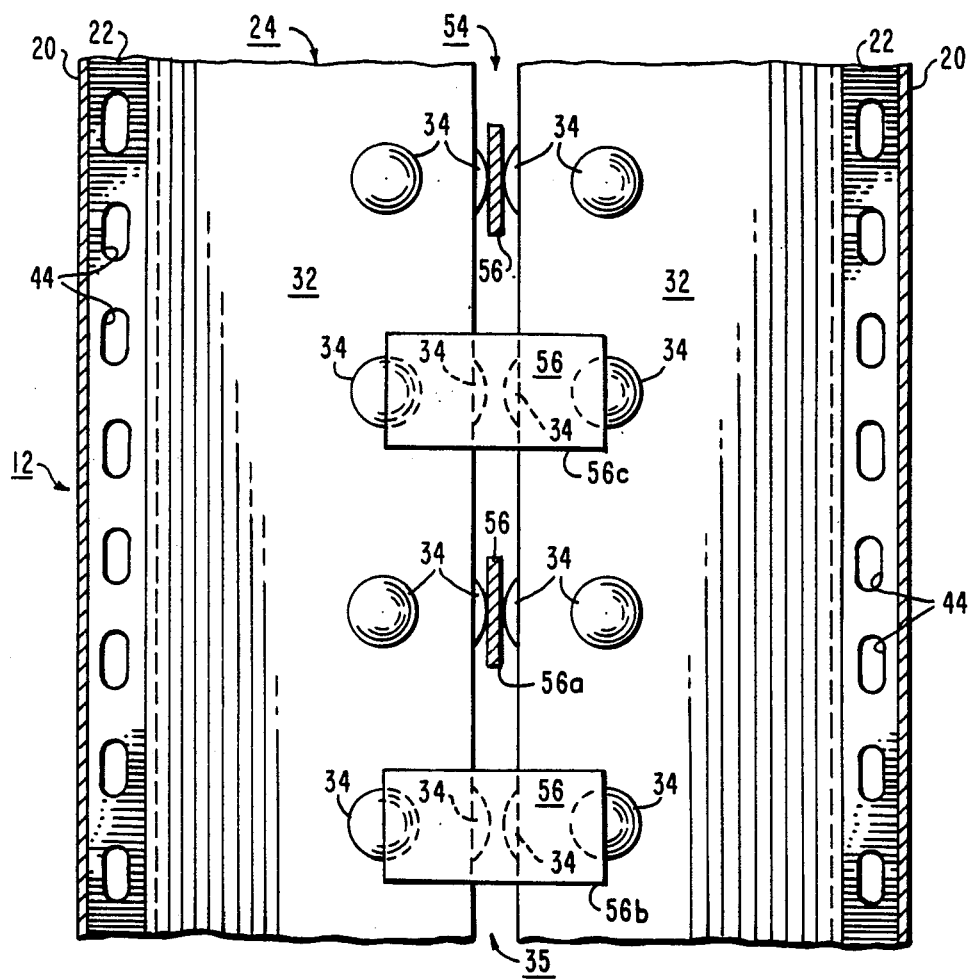
FIG. 6 is a view similar to that of FIG. 3 but showing an alternative embodiment of the cross brace of the present invention.

Another alternative embodiment is seen in FIG. 6. The cross brace 54 is composed of a series of separate, individual elongated, generally rectangular straps 56. The straps, generally designated 56, are axially spaced apart along the central channel portion 35 and alternate one strap to the next between a pair of orthogonally-related positions. In one of the orthogonal positions, one strap 56A interconnects, such as by spot welding, between a respective pair of dimples 34, in each of one pair of opposite water cross panels 30. The adjacent strap 56B or 56C either above or below the one strap 56A in the other orthogonal position interconnects, also such as by spot welding, between another pair of dimples 34 in each of the other pair of opposite water cross panels 30. However, as in the case of the earlier embodiment, the straps 56 lie in planes which intersect generally along the central axis A of the water cross 24.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. In a fuel assembly having a plurality of elongated fuel rods disposed in side-by-side relationship so as to form any array of spaced fuel rods, an outer tubular flow channel surrounding said fuel rods so as to direct flow of coolant/moderator fluid along said fuel rods, and a hollow water cross extending through said outer flow channel and having a plurality of hollow panels which extend radially from a central axis of said water cross and define an open inner flow channel for subcooled moderator fluid flow through said fuel assembly, said panels of said water cross being interconnected at their outer ends with angularly displaced portions of said tubular outer flow channel so as to divide said array of fuel rods into a plurality of subgroups and being interconnected with one another at their inner ends so as to define a central channel portion which extends the axial length of said water cross, the improvement which comprises:

means disposed in said central channel portion and interconnecting each of said panels with the others thereof so as to reinforce and stiffen said panels at their inner ends to prevent deflection of said water cross panels and thereby prevent deflection of said outer channel.

2. The improvement as recited in claim 1, wherein said interconnecting means takes the form of a cross-like structural member disposed generally along said central axis of said water cross within said central channel portion and having radially-extending portions which lie in planes which intersect generally at said central axis and extend outwardly within and in generally parallel relationship with said hollow panels of said water cross.

3. The improvement as recited in claim 2, wherein said cross-like structural member takes the form of a continuous structure extending between opposite ends of said water cross.

4. The improvement as recited in claim 1, wherein:
said each of said panels of said water cross are composed of sheet members and a series of elements extending between said members so as to interconnect said sheet members and space said members apart in forming said inner flow channel; and
said interconnecting means takes the form of a cross-like structural member disposed generally along said central axis of said water cross within said central channel portion thereof, said cross-like member having radially-extending portions which meet generally at said central axis and extend outwardly in generally parallel relationship with and between said sheet members forming said respective hollow panels of said water cross, said radially-extending portions being attached at their outer edges to said respective series of elements of each of said panels.

5. The improvement as recited in claim 4, wherein:
said elements in each said series thereof take the form of dimples which interconnect said sheet members of each of said water cross panels; and
said radially-extending portions of said cross-like structural member at their outer edges have cutouts formed therein at the locations of said dimples such that parts of said edges which are rigidly attached to said respective dimples will also partly encircle said dimples.

6. The improvement as recited in claim 5, wherein said cross-like structural member takes the form of a continuous structure extending between opposite ends of said water cross.

7. The improvement as recited in claim 2, wherein said radially-extending portions of said cross-like structural member takes the form of a series of separate elongated straps being axially spaced along said central channel portion.

8. The improvement as recited in claim 7, wherein said separate axially-spaced straps alternate one strap to the next between a pair of orthogonally-related positions.

* * * * *